May 16, 1939.　　F. X. GOVERS　　2,158,361
MANUFACTURE OF LUBRICATING OIL
Filed Sept. 16, 1932
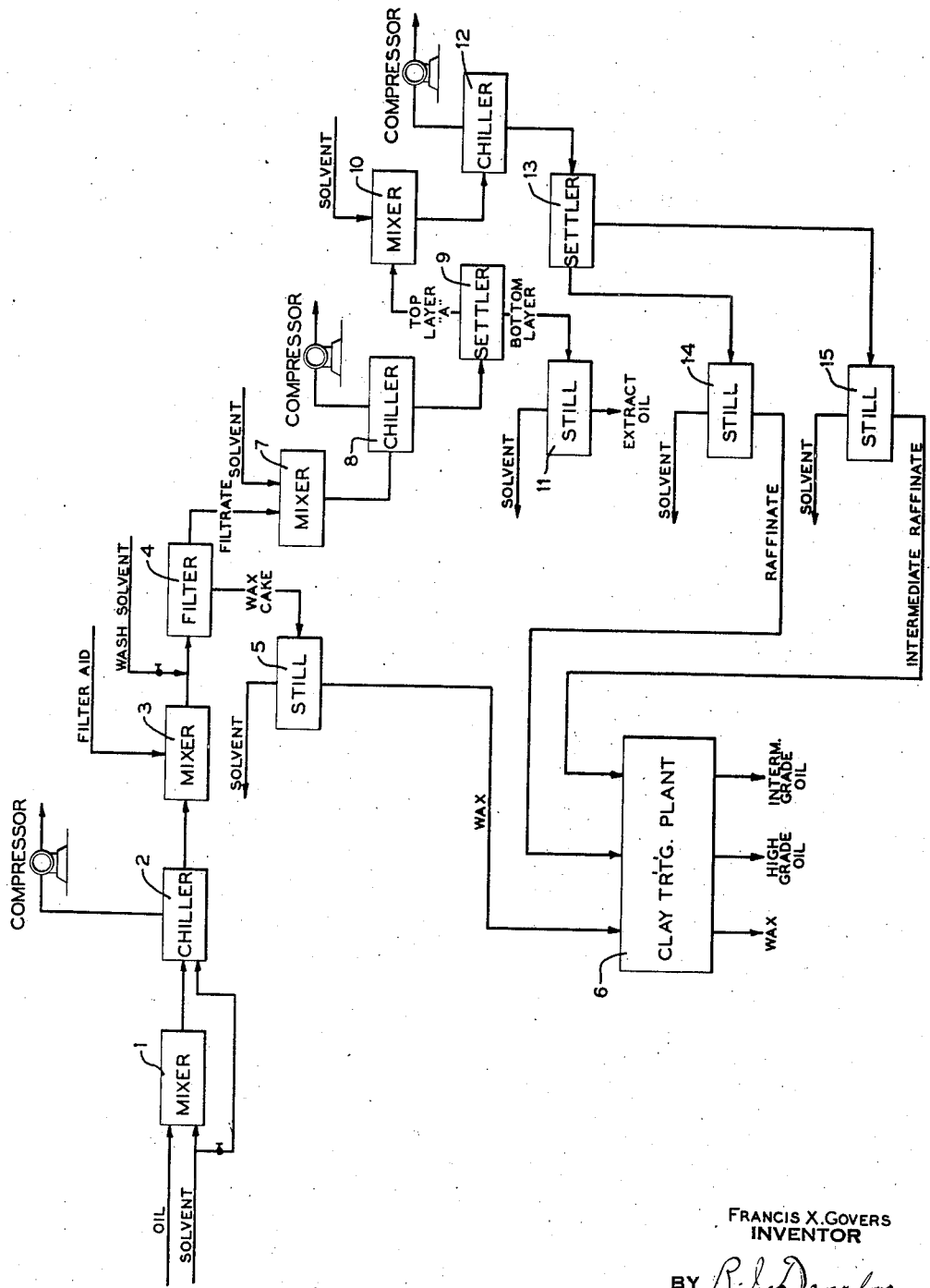
FRANCIS X. GOVERS
INVENTOR
BY R. J. Dearborn
ATTORNEY Patented May 16, 1939

2,158,361

UNITED STATES PATENT OFFICE 2,158,361

MANUFACTURE OF LUBRICATING OIL

Francis X. Govers, Vincennes, Ind., assignor to Indian Refining Company, Lawrenceville, Ill., a corporation of Maine Application September 16, 1932, Serial No. 633,461

13 Claims. (Cl. 196—13)

This invention relates to the manufacture of lubricating oil from hydrocarbon oils, and more particularly to the manufacture of high viscosity index low pour test lubricating oil from wax-bearing mineral oils.

Broadly, the invention contemplates the treatment of hydrocarbon oils, particularly paraffin-bearing lubricating fractions of petroleum, with solvents to selectively produce therefrom low pour test lubricating oils characterized by having a desired viscosity temperature relationship and improved lubricating qualities.

Lubricating oils prepared by the process of my invention, in addition to having the above characteristics, also possess low sulphur content, low carbon residue content, and are free from bodies of relatively little lubricating value.

In my copending applications, Serial Nos. 601,887, and 601,888, both filed March 29, 1932, for Manufacture of lubricating oil, I have described a process for manufacturing lubricating oils comprising dewaxing and extracting wax-bearing mineral oil with a solvent composed of liquid sulphur dioxide in admixture with a modifying solvent liquid, such as benzol or a derivative thereof. The present invention comprises dewaxing and extracting wax-bearing mineral oil with liquid sulphur dioxide, $SO_2$, and a modifying solvent liquid selected from the aliphatic ethers, such, for example, as ethyl ether, $C_2H_5.O.C_2H_5$, or isopropyl ether, $(CH_3)_2CH.O.CH(CH_3)_2$.

In carrying out my invention, wax-bearing mineral oil is mixed with liquid sulphur dioxide and an aliphatic ether, such as ethyl ether or isopropyl ether, in such ratio to each other and to the oil that upon chilling to around 0° F. or below and removing the precipitated wax and the solvent liquids, the oil has a pour test substantially the same as, or even lower than, the chilling temperature. With complete mixing, the resulting mixture is chilled to precipitate the wax constituents and the wax thus precipitated is removed in any suitable manner as by filtering, settling or centrifuging.

To the dewaxed mixture additional liquid sulphur dioxide is added, the ratio of liquid sulphur dioxide to aliphatic ether being increased for the purpose of extracting from the mixture hydrocarbon constituents of the so-called naphthenic type, characterized by having a heavy specific gravity and a low viscosity index. The temperature and pressure at which this extraction is carried out, and the ratio of the solvent liquids to each other and to the oil, may be varied as required in order to effect the particular degree of separation desired.

After removal of the heavy, low viscosity index fraction, the remaining relatively high viscosity index oil is separated into fractions of differing viscosity index by the addition of further quantities of the solvent liquids to the remaining oil and solvent mixture. In this instance, the ratio of the solvent liquids to each other, as well as to the oil, may be either increased or decreased, depending upon the nature of the separation or fractionation desired. Any suitable treating temperature or pressure may also be selected for the purpose of facilitating or modifying the separation, as in the case of the initial extraction of the relatively low viscosity index constituents.

I have found that by the process herein disclosed lubricating oils of any desired viscosity index and scale of purification, coupled with low pour test, can be made from mixed base or paraffin base crude, and the oils so produced are characterized further by low carbon residue and low sulphur content. The obtaining of oils having these desired qualities does not depend on methods involving redistillation or acid treatment. The oils obtained by my process require no refining with sulphuric acid with its attendant undesirable high losses in valuable lubricating oil constituents as well as its consequent production of difficultly disposable acid sludge.

By way of example and for the purpose of illustration, I will now describe the operation of my invention in connection with the purification of an untreated wax distillate obtained by vacuum distillation of a Mid-Continent crude of the Oklahoma type and having the following characteristics:

Gravity °Baumé_____ 24.0
Saybolt Universal viscosity at 210° F_____ 65
Pour point °F_____ 85
Percent sulphur_____ .2

This distillate is mixed with a solvent liquid mixture in the proportion of about one part of wax-bearing oil to about three parts of solvent liquid, the solvent liquid mixture comprising about 20% of liquid sulphur dioxide and 80% of isopropyl ether. The resulting mixture is well stirred to obtain complete mixing and chilled to about −24° F. to precipitate wax.

The chilled mixture, containing suspended wax, is then introduced to filtering means such, for example, as described in my United States Patent No. 2,003,664, wherein the precipitated wax or solid hydrocarbons are separated from the liquid to produce a filter cake and a filtrate containing low pour test oil.

If desired, the filtration may be carried out in the presence of a filter-aid material advantageously of the diatomaceous earth type.

The filter cake in the press is washed with fresh diluted solvent liquid of substantially the same composition as that originally mixed with the wax-bearing oil. The washing may be carried out at substantially the same temperature as that maintained during chilling and filtering.

The resulting solvent wash, which contains an appreciable quantity of dissolved oil removed from the filter cake, is advantageously used as part of the solvent liquid in mixing with the succeeding batch of fresh wax-bearing oil, allowance being made for the dissolved oil contained therein.

After the washing step, the filter cake is removed from the press and subjected to further treatment, as may be desired, for the recovery of wax therefrom. The wax obtained from the cake, after removal of the solvent and after contacting with clay, will be white and have a melting point, without sweating, of approximately 138° F.

Additional quantities of solvent liquid sulphur dioxide are added to the dewaxed filtrate to alter the percentage composition of liquid sulphur dioxide to modifying solvent. The solvent liquid mixture advantageously could be altered to comprise about 45% liquid sulphur dioxide and about 55% isopropyl ether, and the liquid mixture after the addition of the liquid sulphur dioxide would be approximately 6 parts solvent liquid mixture to 1 part of dewaxed oil.

This mixture is then completely mixed and chilled to about —10° F., following which it is allowed to settle and separate into two layers, the lower layer or fraction comprising the naphthenic type bodies characterized by having a low viscosity index and a heavy specific gravity of around 12.3° Bé.

The top layer obtained in the preceding separation and designated as fraction "A", is then mixed with further quantities of liquid sulphur dioxide and isopropyl ether. The mixture is thoroughly stirred and chilled to about —10° F. and then allowed to settle and separate into an upper and a lower layer. The ratio of liquid sulphur dioxide to isopropyl ether used in this instance may be varied, depending on the fractionation desired.

Thus, to fraction "A", there may be added an additional quantity of the solvent liquids comprising about three parts of liquid sulphur dioxide and about five parts of isopropyl ether. The mixture is agitated, cooled to about —10° F. and then allowed to settle with the formation of an upper and lower layer. After recovering the solvent liquid from each of these layers, and separately contacting the remaining oil with about 20 pounds of clay per barrel of oil in the presence of steam and at temperatures up to about 500° F. and filtering, the resulting fractions of oil will have the following characteristics:

|  | Upper layer | Lower layer |
| --- | --- | --- |
| Gravity °Baumé | 29.1 | 25.2 |
| Saybolt Universal viscosity at 210° F | 68 | 74 |
| Pour point °F | —10 | —10 |
| Percent sulphur | .01 | .1 |
| Percent carbon residue | .048 | .2 |
| Viscosity index | 98 | 80 |

However, instead of treating fraction "A" with three parts of additional sulphur dioxide and five parts of additional isopropyl ether, the ratio of these added solvents may be substantially reversed as, for example, treating this fraction with three parts of additional liquid sulphur dioxide and two parts of additional isopropyl ether. In this case, the resulting lower layer, after removal of the solvent, will be of lower lubricating value, having a gravity of about 15° Baumé and, of course, correspondingly low viscosity index.

The resulting upper layer, after removal of the solvent, followed by clay treatment in the same manner as already described in connection with the preceding example, will have the following characteristics:

| | |
| --- | --- |
| Gravity °Baumé | 27.0 |
| Saybolt Universal viscosity at 210° F | 70 |
| Pour point °F | —15 |
| Percent sulphur | .1 |
| Pecent carbon residue | .15 |
| Viscosity index | 87. |

While the use of isopropyl ether has been specified in describing the foregoing examples, other members of the aliphatic ethers may also be used; for example, ethyl ether, as already mentioned.

An important advantage of my process when using the foregoing solvent liquids resides in the possibility of effecting internal refrigeration of the mixtures with the oil by vaporizing a portion of the solvent liquid or liquids. Thus, in the dewaxing step, as well as in the subsequent extracting steps, where low temperatures are desired, the mixtures may be cooled by refrigeratively vaporizing a portion of the liquid sulphur dioxide or aliphatic ether, or both, after the manner described, for example, in U. S. Patent No. 1,862,874.

The invention will now be illustrated by reference to the following drawing comprising a flow diagram of the process.

Wax distillate from a source not shown is introduced to a mixer 1 wherein it is mixed with the solvent, also conducted from a source not shown. This mixture is conducted to a chiller 2. As indicated, chilling is effected by refrigeratively evaporating surplus solvent therefrom. This surplus solvent may have been added to the mixture in the mixer 1, or it may be injected while in a liquefied condition directly to the fluid contents of the chiller 2.

The chilled mixture is advantageously conducted to a mixer 3 wherein a suitable filter-aid material such as diatomaceous earth is added if desired.

The chilled mixture is thereafter introduced to a filter 4 to remove the precipitated wax as a filter cake and to produce a dewaxed filtrate.

The wax cake is advantageously washed in situ by passing through the filter a suitable quantity of wash solvent.

After washing, the wax cake is removed and conducted to a still 5 wherein the solvent is recovered from the wax. The solvent-free wax is then conducted to a clay-treating plant 6 wherein it is contacted with clay in the presence of steam to produce a light-colored wax.

The dewaxed filtrate issuing from the filter 4 is conducted to a mixer 7 wherein the composition of the solvent is altered as, for example, by the addition of a further quantity of the selective solvent, sulphur dioxide.

The mixture is now conducted to a chiller 8, similar to the chiller 2 previously described, wherein the mixture is chilled to the temperature necessary to cause separation into phases. The chilled mixture is passed to a settler 9 wherein separation into phases occurs.

The top layer, previously referred to as fraction "A", is drawn off to a mixer 10, while the bottom layer is drawn off to a still 11. The solvent is removed from this bottom layer in the still 11 to produce extract oil of naphthenic character.

Referring again to the mixer 10, additional solvent is introduced thereto as, for example, a further quantity of liquid sulphur dioxide and aliphatic ether such that upon cooling the resulting mixture will again separate into layers or phases.

The cooled mixture is drawn off to a chiller 12, similar to the chiller 2 previously described, and from there conducted to a settler 13, where separation into phases occurs. The top layer is drawn off to a still 14 to recover the solvent and produce a raffinate.

The bottom layer collecting in the settler 13 is drawn off to a still 15 to recover the solvent and produce intermediate raffinate. These raffinates are conducted to the clay-treating plant 6 previously referred to, and there separately contacted with clay in the presence of steam to produce finished oils.

I have found that isopropyl ether in admixture with liquid sulphur dioxide is particularly advantageous as a dewaxing solvent. The mixture of 20% sulphur dioxide and 80% isopropyl ether in the proportion of about three parts solvent to one part of wax distillate, chilled to −10° F. and filtered, results, after the removal of the solvent, in a dewaxed oil having a pour point below the temperature at which it is chilled. In these proportions, the solvent exhibits selectivity between solid hydrocarbons and liquid hydrocarbons with no selective action between liquid hydrocarbons of varying composition.

As the concentration of sulphur dioxide is increased, the selective action begins to take effect as between liquid hydrocarbons of differing characteristics.

The invention is not limited to the production of final products having the particular characteristics of those described above. Products of differing characteristics, as desired, may be prepared by varying the proportions of the solvent liquids and also the temperatures at which the treating steps are carried out.

Furthermore, the invention is not limited to the treatment of wax distillate such as given in the examples herein, but is adapted to the treatment of other paraffin containing fractions, precipitates, wax concentrates or materials, somewhat similar in nature, derived in various ways from mineral oils.

Thus, my invention is applicable to the treatment of hydrogenation products resulting from the hydrogenation of carbonaceous materials, or mineral oils, including liquid or solid hydrocarbon fractions derived from mineral oils. Hydrogenation products may contain substantial quantities of waxy or paraffin material as well as other constituents of relatively low lubricating value. By treating such products in accordance with my invention, final products of desired characteristics can be obtained.

Obviously many modifications and variations of the invention, as hereinbefore set forth, may be made without departing from the spirit and scope thereof, and therefore only such limitations should be imposed as are indicated in the appended claims.

I claim:

1. The method of manufacturing low pour test lubricating oil of high viscosity index from wax-bearing mineral oil comprising mixing with the oil a solvent liquid composed of liquid sulphur dioxide and a modifying solvent liquid selected from the low boiling aliphatic ethers consisting of ethyl ether and isopropyl ether mixed in such proportion to each other and to the oil that upon chilling to around 0° F. and removing the precipitated wax and the solvent liquids the oil has a pour test of 0° F. or below, chilling the mixture to precipitate wax constituents and removing the wax thus precipitated, mixing additional liquid sulphur dioxide with the dewaxed mixture while cold to separate undesired constituents of low viscosity index, removing the separated constituents, and further extracting the remaining oil with the solvent liquids mixed in a proportion to each other and to the oil adapted to separate the oil into fractions of desired viscosity index.

2. The method of manufacturing low pour test lubricating oil of high viscosity index from wax-bearing mineral oil comprising mixing with the oil a solvent liquid composed of liquid sulphur dioxide and a modifying solvent liquid selected from the low boiling aliphatic ethers consisting of ethyl ether and isopropyl ether, the aliphatic ether being in the predominant proportion, chilling the mixture to a temperature around 0° F. or below to precipitate wax constituents, removing the precipitated wax constituents, mixing further solvent liquid with the dewaxed mixture and increasing the concentration of liquid sulphur dioxide to separate undesired constituents of low viscosity index, removing the separated constituents, and further extracting the remaining oil with additional quantities of the solvent liquids mixed in a proportion to each other and to the oil adapted to separate the oil into fractions of desired viscosity index.

3. In the manufacture of low pour test lubricating oil from wax-bearing mineral oil, the method of separating wax constituents therefrom which comprises mixing with the wax-bearing oil a solvent liquid mixture composed of liquid sulphur dioxide and a modifying solvent selected from the low boiling aliphatic ethers of the character of ethyl and isopropyl ether mixed in proportion to each other and to the oil that upon chilling to around 0° F. or below and removing the precipitated wax and the solvent liquids the oil has a pour test substantially the same as the chilling temperature, chilling the mixture to precipitate the wax constituents, and separating the wax thus precipitated.

4. In the manufacture of low pour test lubricating oil from wax-bearing mineral oil, the method of separating wax constituents therefrom which comprises mixing with the wax-bearing oil a solvent liquid mixture composed of liquid sulphur dioxide and isopropyl ether mixed in such proportion to each other and to the oil that upon chilling to around 0° F. or below and removing the precipitated wax and the solvent liquids the oil has a pour test substantially the same as the chilling temperature, chilling the mixture to precipitate the wax constituents, and separating the wax thus precipitated.

5. In the manufacture of low pour test lubricating oil from wax-bearing mineral oil, the method of separating wax constituents therefrom which comprises mixing with the wax-bearing oil a solvent liquid mixture composed of liquid sulphur dioxide and ethyl ether mixed in such proportion to each other and to the oil that upon chilling to around 0° F. or below and removing the precipitated wax and the solvent liquids the oil has a pour test substantially the same as the chilling temperature, chilling the mixture to precipitate the wax constituents, and separating the wax thus precipitated.

6. In the process of separating wax constituents from wax-bearing oil substantially as described in claim 3, the method of cooling the mixture of oil, liquid sulphur dioxide and low boiling aliphatic ether of the character of ethyl and isopropyl ether comprising vaporizing a portion of the solvent liquids from the mixture with refrigerative effect.

7. The process of dewaxing wax-bearing mineral oil comprising mixing the oil with an extraction solvent liquid having a selective action substantially of the character of that of sulphur dioxide as between naphthenic and paraffinic constituents of the oil and an aliphatic ether having the character and solvent action of ethyl and isopropyl ether in proportions such that at temperatures of the order of 0° F. and below the oil is substantially completely soluble therein and the wax substantially insoluble therein, chilling the mixture to solidify the wax, removing the solidified wax, and recovering the solvent from the dewaxed oil.

8. The process of manufacturing a low pour test high viscosity index lubricating oil from wax-bearing mineral oil which comprises mixing the oil with a solvent mixture composed of an extraction solvent having a selective action substantially of the character of that of sulphur dioxide as between constituents of the oil of differing viscosity index and an aliphatic ether having the character and solvent action of ethyl and isopropyl ether, in proportions such that at temperatures of the order of 0° F. and below the solvent mixture has a selective action as between oil and wax, chilling the mixture to solidify the wax, removing the solidified wax, altering the ratio of selective solvent to ether in the resulting dewaxed mixture so that the solvent liquid mixture exerts selective action as between relatively low and relatively high viscosity index constituents, separating from the said mixture a fraction of desired viscosity index and pour test, and recovering the solvent therefrom.

9. In the manufacture of mineral lubricating oil, the method which comprises mixing wax-bearing mineral oil containing relatively low and relatively high viscosity index constituents with sulphur dioxide and an aliphatic ether selected from the group consisting of ethyl ether and isopropyl ether in proportions such that the mixture has selective action as between wax and oil at temperatures of around 0° F., chilling the mixture to precipitate wax, removing the wax thus precipitated to produce a dewaxed mixture of oil and solvent, modifying the solvent composition of the dewaxed mixture, separating the mixture into an extract phase containing low viscosity index constituents, and a raffinate phase containing high viscosity index constituents, and separating the two phases.

10. In the manufacture of mineral lubricating oil, the method which comprises mixing wax-bearing mineral oil containing relatively low and relatively high viscosity index constituents with a selective extraction solvent having relatively high selectivity as between low and high viscosity index constituents and an aliphatic ether selected from the group consisting of ethyl ether and isopropyl ether substantially in excess of about 55% of the solvent mixture and in proportions such that the mixture has selective action as between wax and oil at temperatures of around 0° F., chilling the mixture to precipitate wax, removing the wax thus precipitated to produce a dewaxed mixture of oil and solvent, modifying the solvent composition of the dewaxed mixture by substantially decreasing the ratio of ether to selective extraction solvent, separating the mixture into an extract phase containing low viscosity index constituents, and a raffinate phase containing high viscosity index constituents, and separating the two phases.

11. The process of dewaxing wax-bearing mineral oil which comprises mixing the oil with sulphur dioxide and an aliphatic ether selected from the group consisting of ethyl ether and isopropyl ether in proportions such that the mixture has selective action as between wax and oil at temperatures of around 0° F., chilling the mixture to precipitate wax, and removing the wax thus precipitated.

12. The method of dewaxing wax-bearing mineral oil which comprises mixing the oil with a mixture of sulphur dioxide and an aliphatic ether selected from the group consisting of isopropyl and ethyl ether, the solvent mixture containing around 20% of sulphur dioxide and mixed with the oil in such proportion that at 0° F. and below the mixture has substantially complete solvent action on the liquid hydrocarbon constituents of the oil, and substantially no solvent action on the solid hydrocarbon constituents, chilling the mixture to precipitate the solid hydrocarbon constituents, and removing the solid hydrocarbons so precipitated.

13. The method of dewaxing and extracting wax-bearing mineral oil containing high and low viscosity index constituents which comprises mixing the oil with a mixture of sulphur dioxide and an aliphatic ether selected from the group consisting of isopropyl and ethyl ether, the solvent mixture containing around 20% of sulphur dioxide and mixed with the oil in such proportion that at 0° F. and below the mixture has substantially complete solvent action on the liquid hydrocarbon constituents of the oil and substantially no solvent action on the solid hydrocarbon constituents, chilling the mixture to precipitate the solid hydrocarbon constituents, removing the solid hydrocarbons so precipitated, modifying the composition of the resulting dewaxed solution by increasing the ratio of sulphur dioxide to ether in the solvent mixture, separating the mixture into an extract phase containing low viscosity index constituents and a raffinate phase containing high viscosity index constituents, and separating the two phases.

FRANCIS X. GOVERS.